Patented Nov. 28, 1933

1,937,323

UNITED STATES PATENT OFFICE

1,937,323

LAMINATED GLASS

Harry Trainor Neher, Bristol, and Charles Samuel Hollander, Philadelphia, Pa., assignors to Rohm & Haas Company, Philadelphia, Pa.

No Drawing. Application June 1, 1932
Serial No. 614,842

9 Claims. (Cl. 49—81)

This invention relates to new polymeric materials, and laminated glass containing these materials as an intermediate layer.

An object of this invention is to prepare films suitable for making laminated glass which show a marked improvement over any films heretofore employed. A further object of this invention is to prepare films by polymerizing together polymerizable derivatives of unsaturated organic compounds, particularly esters of acrylic acid and its higher homologues such as methacrylic acid.

Further objects will appear hereinafter.

The plastic used in laminated glass by one of the first men in the field, Benedictus, was celluloid. Gelatin, from which substantially all the moisture is removed, has been used as a cement in connection with celluloid. Celluloid presents many disadvantages. No two batches are exactly alike and constant check-ups must be made to insure uniformity. Although improvements have been made in it, it is still somewhat unsatisfactory. A temperature of 120° F. is the approximate limit up to which celluloid glass would give good service, and at about 60° F. and below the glass has a tendency toward brittleness.

On the other hand, various substitutes for celluloid have been proposed. Cellulose acetate will bear up well under temperatures up to the boiling point of water but has the disadvantage of a tendency toward brittleness, more haze, and greater cost. Laminations with regenerated cellulose are also very brittle.

Synthetic resins have been proposed but none have found commercial use. "Bakelite" and toluol-sulfonamide formaldehyde resins have been tried but so far as is now known have not been found practicable. Polymers of various unsaturated organic compounds have been suggested and itaconic acid esters have been tried as a cement.

All of the above have disadvantages, particularly unsuitability to variations in temperature. If they show up well at moderate or high temperatures they usually are detrimentally affected by low temperatures and vice versa. They also have a tendency toward discoloration. While under ordinary service conditions the discoloration in a celluloid glass is usually not particularly noticeable in a year's time, it is apt to become evident not long after. This invention is designed to eliminate the tendency toward discoloration, and it is particularly true of glass using polymers of esters of acrylic acid and its homologues that discoloration is practically eliminated.

In the manufacture of many articles involving the use of synthetic resins, it is usually desirable to employ a resin having a specific set of properties. Often, no one resin shows all the desired properties for the use at hand. However, it might be concluded that by mixing a resin A, which is good in certain of the desired properties with another resin B, which, while inferior in those properties in which A excels, is superior in the properties desired but lacking in resin A, it would be possible to have in the resulting combination, a resin which would possess all the desirable properties lacking in each individual resin. Actually, this does not seem to be the case, as may be seen by the untrained eye. When solutions of two or more tough, transparent polymeric substances are mixed and the solvent then removed by evaporation, the resulting films are not tough and transparent as might be expected. Instead, they show varying degrees opaqueness, a rough mottled appearance, and generally tear very easily in a characteristic manner.

The explanation for this very general phenomenon is probably that resins, being of high molecular weight, do not dissolve in each other, but exist side by side unblended, and the larger the molecules, the less continuous or uniform or transparent is the mixture. A similar phenomenon may be observed in the field of metallic alloys.

We have made the surprising discovery, however, that if the monomeric substances are first mixed in any proportion whatsoever and then polymerized together by any suitable method, the films produced from such polymeric substances show all the properties of the parent polymers to a degree depending on the proportion in which each is incorporated in the new polymer.

The polymeric substances with which this application is concerned can all be made from monomeric unsaturated organic compounds belonging to one or more of the following two general types:

I. *Compounds with a methylene group*

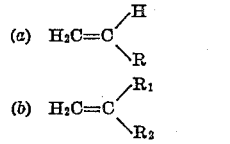

II. *Compounds with a conjugated system*

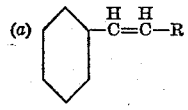

R may be any alkyl, aryl, aryl-alkyl group or halogen. $R_1$ may or may not equal $R_2$.

When a single compound of, say Example IA, is polymerized, there is every reason to believe that the resulting polymer consists of a great variety of molecular chains of various lengths.

The following formula might be given as an example of a typical section of such a molecule:—

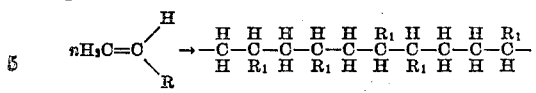

Similarly, a single compound from Example IB might be represented as follows:—

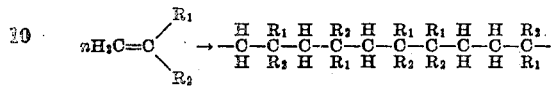

In Class II polymerization might take place either by coupling thru 1—2 addition (similar to that of the Class I compounds) or thru 1—4 addition, or a combination of 1—2 and 1—4 addition. 1—4 addition might be represented as follows:

n>C=C—C=C<→—C—C=C—C—C—C=C—C—C—C=C—C

A combination of 1—2 and 1—4 addition might be represented in this manner:

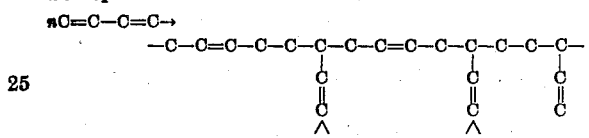

If solutions of different polymers of either the same class or different classes are mixed, it is easy to see why these polymers would not be mutually soluble, both because of the size and the specific properties possessed by each. Similar reasoning would apply equally well to any of the other possible mechanical mixtures.

On the other hand, if, for example, a monomer from Example IA is mixed with one from Example IB and the mixture then polymerized, the resulting polymer would consist of molecular chains in which both monomers would be joined at random in each chain. A section of such a chain would then be represented as follows:

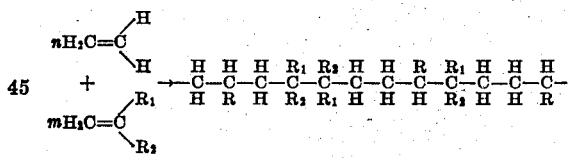

Here the individually different molecules of the two monomers have become a definite part of one and the same molecule of the polymer. Such a molecule would have its own set of properties which would be different from those of either monomer polymerized alone, but dependent on each. Furthermore, in the former case the different monomeric substances are united by primary valences and are, therefore, true chemical compounds, whereas in the later case they are mere mechanical mixtures. The above reasoning is just as valid when applied to polymers prepared by mixing and then polymerizing any other mixture of different monomers, either of the same or different classes.

To illustrate our invention more fully, we shall give the following examples, it being definitely understood that in so doing we are not restricting ourselves in any way to the specific proportions, ingredients, temperatures, time, catalysts, solvents, etc., which may be varied within wide limits.

*Class I*

Example 1A.—50 parts of vinyl acetate, 50 parts of ethyl alpha methyl acrylate, 100 parts of ethyl acetate and .05 parts of benzoyl peroxide are mixed and kept under reflux on a water bath at 100° C. for 48 hours. The resulting viscous solution is analyzed for total polymer by evaporating off the solvent from a weighed sample. The solution is then diluted with ethyl acetate, so that the final solution contains 20% gum by weight. Films are made from this solution. The films so obtained are perfectly smooth and transparent and have a good tensile strength.

Example 1B.—If the vinyl acetate is polymerized beforehand, and also the ethyl alpha methyl acrylate, in the way described, and separate 20% solutions prepared in ethyl acetate, and the solutions mixed, the films obtained are rough, cloudy and tear very easily in a characteristic manner, indicating that they are not homogeneous mixtures. In every respect, they are very much inferior to films prepared as described above.

Example 2.—50 parts of ethyl alpha methyl acrylate, 50 parts of diethyl itaconate, 100 parts of ethylene dichloride and .05 parts of benzoyl peroxide are treated under the same conditions as described in Example 1A. The films made from this solution are similar to 1A in smoothness, transparency and tensile strength and intermediate properties. If, however, the two esters are separately polymerized and mixed, the films obtained from the solution have the same bad characteristics described in 1B.

Example 3.—25 parts of ethyl alpha methyl acrylate, 75 parts of methyl acrylate, 100 parts of benzene and .05 parts of benzoyl peroxide are treated under the same conditions as described in Example 1A. The films made from this solution are similar to 1A in smoothness, transparency and tensile strength, etc. If, however, the two esters are separately polymerized and mixed, the films obtained from the solution have the same bad characteristics described in 1B.

Example 4.—50 parts of methyl vinyl ketone, 50 parts of ethyl alpha methyl acrylate, 150 parts of carbon tetrachloride, and .08 parts of benzoyl peroxide are treated under the same conditions as described under 1A. Films from this solution are similar to those from 1A. Films from the mechanical mixture of the individual polymers are similar to 1B.

Example 5.—50 parts styrene, 50 parts ethyl alpha methyl acrylate and 0.1 parts benzoyl peroxide are kept at 100° C. for 48 hours. Films made from a solution in benzene of the resulting polymer are similar to 1A in clearness, etc. Films from mixtures of the individual polymers are similar to 1B.

*Class II*

Example 6.—5 parts cyclopentadiene (monomer), 5 parts indene, 15 volumes of chloroform are mixed. To it is added 0.2 parts of tin tetrachloride in 1 volume of chloroform. The solution turns deep red and a vigorous reaction takes place almost immediately, causing a good deal of the solvent to boil off. After a half hour, 10 volumes of chloroform are added and the entire solution poured into 100 volumes of absolute alcohol. The precipitated polymer is filtered from the alcohol and dissolved in 10 to 15 volumes of hot benzene, cooled and again precipitated with alcohol. This is repeated until the polymer gives a colorless solution. Films from such a solution are smooth and transparent, but somewhat brittle. Films made from solutions of the individual polymers are very brittle, opaque and rough.

*Classes I and II*

Example 7.—50 parts ethyl cinnamate, 50 parts ethyl alpha methyl acrylate and .05 parts benzoyl peroxide are kept at 100° C. for 48 hours. The solution of the resulting polymer in ethylene dichloride gives films similar to 1A except they are somewhat softer. Films from the mixture of the individual polymers are similar to 1B.

Example 8.—50 parts indene, 50 parts ethyl alpha methyl acrylate and .08 parts benzoyl peroxide are kept at 100° C. for 72 hours. The resulting solid polymer, when dissolved in chloroform, gives films which are clear and transparent, but somewhat brittle. Films made by mixing solutions of polyindene and polyethyl alpha methyl acrylate are opaque and of a spotted appearance.

The films prepared as above can be used in the making of laminated glass by any of the methods employed. One process by which a good glass is produced is as follows:

A piece of sheet drawn glass 12"x12" is framed in a wood frame, the glass is then leveled, and about 140 cc. of a solution of any of the above films is poured on. The frame is then covered with paper or glass until the solution has spread out evenly and all air bubbles have disappeared. Then the solvent is allowed to evaporate by gradually increasing the temperature. When the film is free from solvent, it is sprayed with about 10 cc. of a plasticizer such as dibutyl phthalate; a glass plate of the same dimensions is then superimposed upon the film, and the two sheets are then pressed between absorbent paper at a temperature of about 175° C. and about 70 lbs. pressure for about ten minutes. The laminated glass so produced has a smooth, homogeneous appearance, excellent transparency and good strength. Instead of covering only one of the two glass sheets with the gum solution, both of them may be covered, and after the application of the plasticizer to each they may be pressed together in the same manner.

If the vinyl acetate solution and the ethyl-alpha methyl acrylate solutions are each polymerized separately in the way described and then the solutions mixed, the laminated glass obtained with this mixed solution in the above described manner is cloudy, not homogeneous, and not perfectly transparent, and shows poor tensile strength on breaking, indicating that the mixture of the solution is not homogeneous. In every respect the glass thus prepared is inferior to that made according to Example 1A.

The laminated glass made in the above ways shows great improvement over that already known to the art. Particularly is this true of the glass employing as intermediate layer a film comprising a polymer of mixed esters of acrylic acid and its homologues. The polymer can be prepared from a mixture of esters of one acid, or of several of the acids. The preferred acids are acrylic and alpha methacrylic.

It is to be understood that the above examples are merely illustrative and in no way restrict the invention. It is apparent to anyone versed in the art that temperatures, pressures, modes of operation, ingredients, solvents and plasticizers, etc. can be varied over wide limits within the spirit of the invention. In preparing the glass the films are ordinarily made beforehand and affixed in a suitable manner. However, it is sometimes advantageous to partially polymerize the mixed materials beforehand and complete the polymerization in situ. Any polymerizing influences can be used including light, heat, pressure, catalysts, etc. It is apparent that most of the ordinary organic solvents can be used such as benzene, toluene, xylene, chlorobenzene, ethylene dichloride, chloroform, carbon tetrachloride, ethyl acetate, methyl acetate, methyl formate, acetone, ethers. Likewise, suitable plasticizers will suggest themselves to anyone versed in the art. These include: dibutyl phthalate, diethyl phthalate, dibutyl and diethyl tartrate, halowax oil, tricresyl phosphate, butyl carbitol, butyl cellosolve, butyl stearate, diethyl malonate, diethyl succinate, diphenyl carbonate, methyl hexyl carbinol, benzoyl benzoate.

The scope of the invention is limited only as indicated in the following claims, it being understood that no portion of the invention is intended to be abandoned or dedicated to the public.

What we claim is:

1. A laminated object comprising at least one sheet of glass and a film comprising a polymer of a mixture of at least two unsaturated organic compounds.

2. A laminated object comprising at least one sheet of glass and a film comprising a polymer of a mixture of at least two unsaturated organic compounds whose polymers are elastic and transparent.

3. A laminated glass comprising at least one sheet of glass and a film comprising a polymer of a mixture of at least two compounds of the group consisting of unsaturated organic compounds with a methylene group:

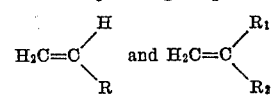

where R may be any alkyl, aryl, aryl-alkyl group or halogen.

4. A laminated glass comprising at least one sheet of glass and a film comprising a polymer of a mixture of at least two compounds of the group consisting of unsaturated organic compounds with a conjugated system:

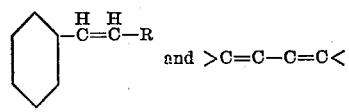

where R may be any alkyl, aryl, aryl-alkyl group or halogen.

5. A laminated glass comprising at least one sheet of glass and a film comprising a polymer of a mixture of at least two compounds of the group consisting of esters of acrylic and α methacrylic acid.

6. A laminated glass comprising at least one sheet of glass and a film comprising a polymer of a mixture of one of the group of esters of acrylic acid, and α methacrylic acid, with vinyl ketone.

7. A laminated glass comprising at least one sheet of glass and a film comprising a polymer of a mixture of a compound of the group consisting of esters of acrylic acid and α methacrylic acid, with esters of itaconic acid.

8. A shatterproof glass comprising a plurality of glass sheets and an intermediate layer comprising the polymer of a mixture of one of the group of the ethyl and methyl esters of acrylic acid and one of the group of the ethyl and methyl esters of α methacrylic acid.

9. A shatterproof glass comprising a plurality of glass sheets and an intermediate layer comprising a polymer of a mixture of ethyl α methacrylate and methyl acrylate.

HARRY T. NEHER.
CHARLES S. HOLLANDER.

DISCLAIMER 1,937,323.—*Harry Trainor Neher*, Bristol, and *Charles Samuel Hollander*, Philadelphia, Pa. LAMINATED GLASS. Patent dated November 28, 1933. Disclaimer filed August 4, 1937, by the assignee, *Röhm & Haas Company*.
Hereby enters its disclaimer of claims 1 and 2 of the said patent.
[*Official Gazette August 31, 1937.*]